Figure 7:
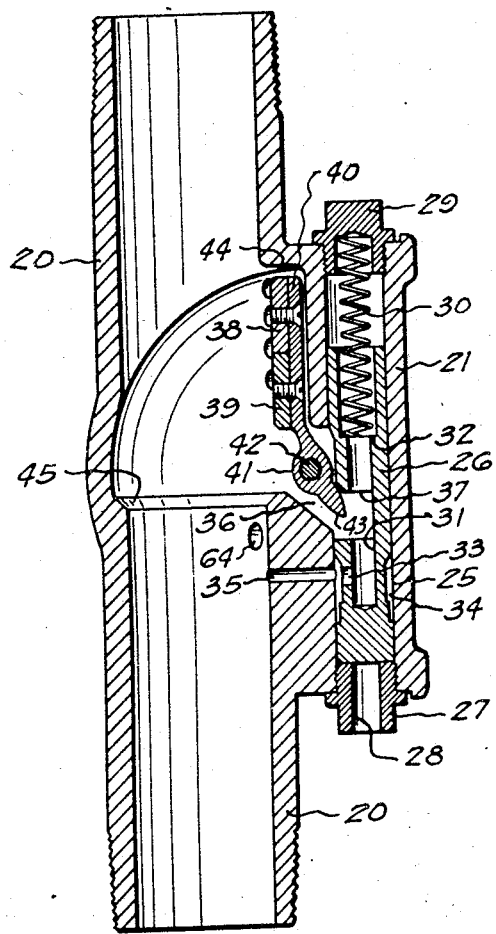

May 13, 1941.    R. E. MILLICAN    2,241,643
FLOW DEVICE
Filed April 1, 1939    4 Sheets-Sheet 1
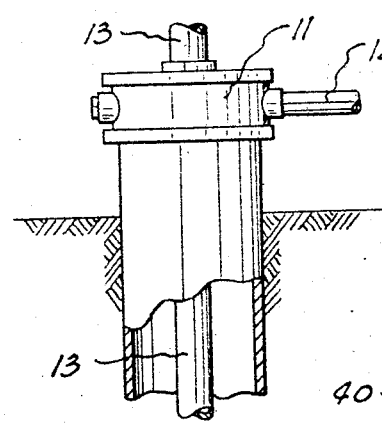
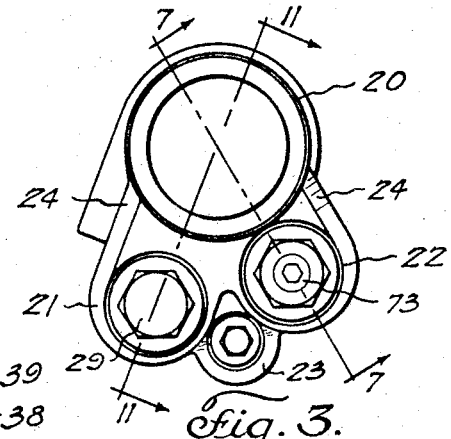
Fig. 3.
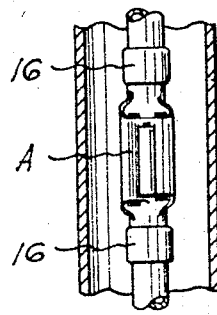
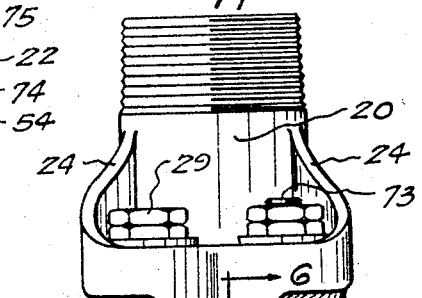
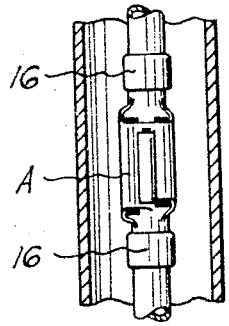
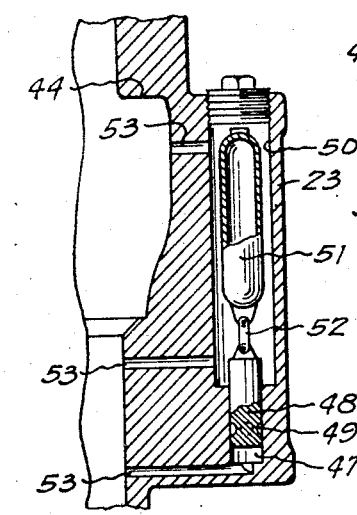
Fig. 4.
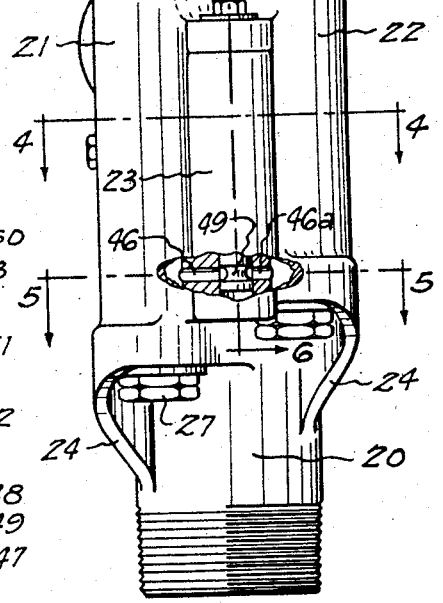
Fig. 2.
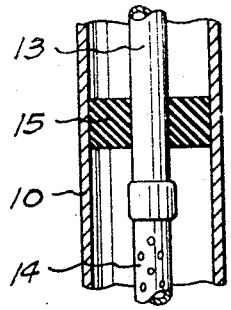
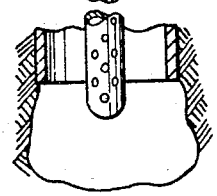
Fig. 6.
Fig. 1.
Inventor
Roy E. Millican
By Jack A. Ashley
Attorney May 13, 1941.　　　　R. E. MILLICAN　　　　2,241,643

FLOW DEVICE

Filed April 1, 1939　　　　4 Sheets-Sheet 2

Inventor
Roy E. Millican
By Jack A. Ashly
Attorney

May 13, 1941.   R. E. MILLICAN   2,241,643
FLOW DEVICE
Filed April 1, 1939   4 Sheets-Sheet 3

Inventor
Roy E. Millican
Jack A Ashley
Attorney

May 13, 1941.  R. E. MILLICAN  2,241,643

FLOW DEVICE

Filed April 1, 1939  4 Sheets-Sheet 4

Inventor
Roy E. Millican

Jack A Ashley
Attorney

Patented May 13, 1941

2,241,643

UNITED STATES PATENT OFFICE 2,241,643

FLOW DEVICE

Roy E. Millican, Dallas, Tex., assignor of fifty-four and one-fourth per cent to Carlton Meredith, Dallas, Tex.

Application April 1, 1939, Serial No. 265,414

21 Claims. (Cl. 103—233)

This invention relates to new and useful improvements in flow devices.

One object of the invention is to provide an improved flow device for controlling the admission of an auxiliary lifting fluid, such as gas or air into a well liquid column, whereby said column is lifted or raised to the surface by said fluid.

An important object of the invention is to provide an improved flow device for controlling the admission of a lifting gas into a liquid and having means associated therewith for preventing a back flow of liquid downwardly through the tubing during operation of the device, whereby once the liquid is lifted upwardly past the device, it cannot fall downwardly thereby; the arrangement providing for a true stage lift when a plurality of said devices are connected in the tubing string at various elevations therein.

A particular object of the invention is to provide an improved flow device, wherein the admittance of the lifting gas is controlled by a spring-pressed element which has one end exposed to the lifting gas pressure whereby the pressure at which the gas is admitted may be accurately controlled by varying the tension of the spring and also whereby the plunger is not dependent on a differential in pressures between the lifting gas and the well liquid for its operation.

Another object of the invention is to provide an improved flow device, of the character described, having means for admitting a lifting gas into the well tubing in such manner as to draw the well liquid through the device and then force the same upwardly through the tubing thereabove, whereby a suction, rather than a pushing action is employed for starting and flowing of the well liquid, which not only facilitates initial starting of the flow but makes it possible to continue efficient flow with a minimum amount of lifting gas at a minimum pressure.

A further object of the invention is to provide an improved flow device for flowing well liquids, wherein a float operated valve is associated with the lifting gas inlet, whereby in the event no well liquid is present adjacent the flow device, no gas can enter the tubing regardless of the position of the operating parts of said device, thus preserving the lifting gas pressure and maintaining the same until needed.

Still another object of the invention is to provide an improved flow device including a swinging check valve adapted to close the bore of the tubing and associated with the lifting gas inlet plunger, whereby when gas is flowing into the tubing, the check is closed to cause the well liquid to by-pass therearound through the flow device, said check being constructed so as to automatically swing to an open position and shut off the incoming gas in the event that the pressure therebelow is sufficient to raise the well liquid without the aid of the auxiliary lifting gas.

A still further object of the invention is to provide a flow device, of the character described, having an improved means for introducing the gas into the tubing, said means including a plurality of jets for creating a suction to draw the well liquids upwardly therethrough, the admittance of lifting gas to said means being controlled by a spring-pressed plunger which is actuated by the pressure of the lifting gas.

A construction designed to carry out the invention will be hereinafter described, together with other features of the invention.

Figure 8:
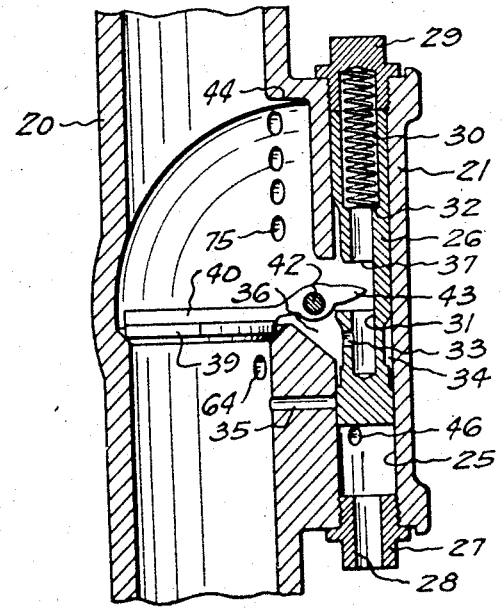
Figure 11:
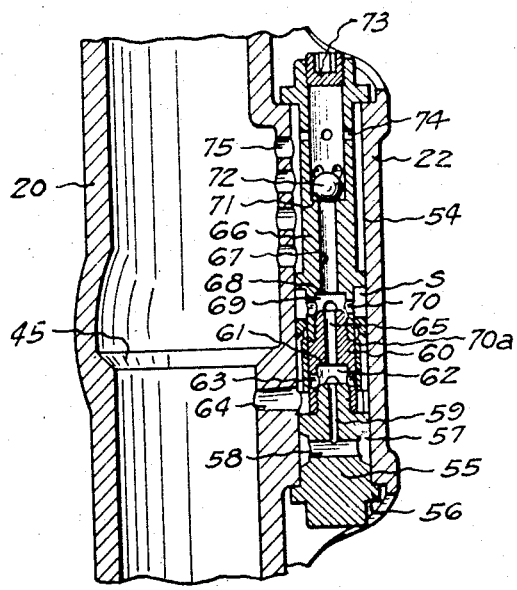
Figure 5:
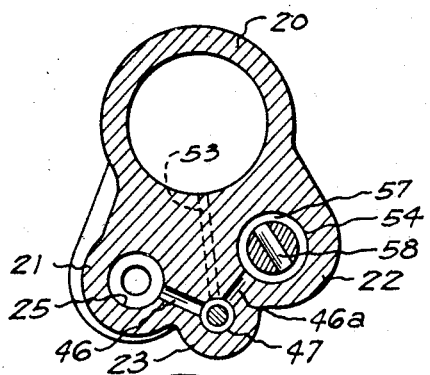
Figures 9, 10:
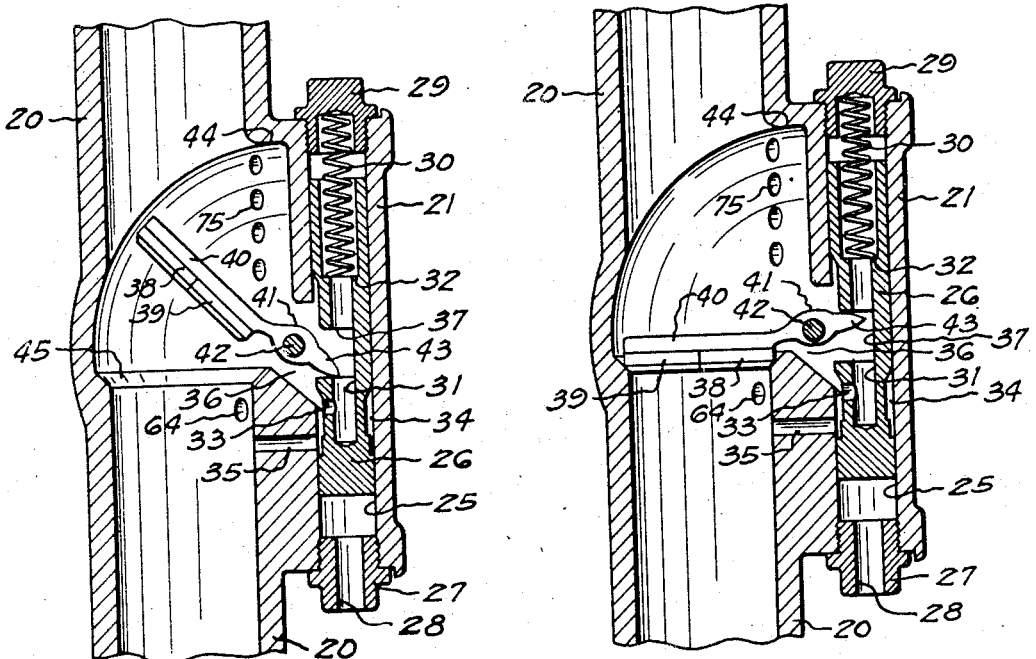
Figures 12, 13:
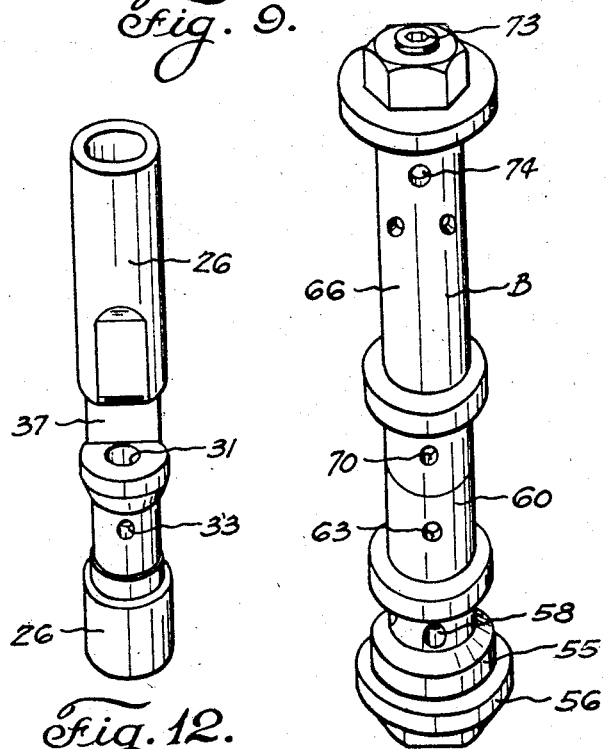
Figure 14:
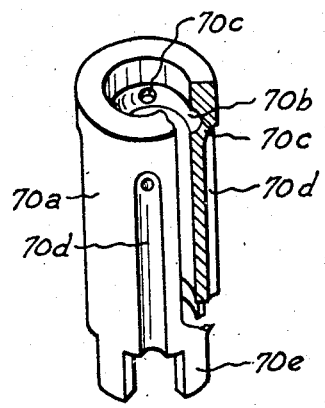
Figure 15:
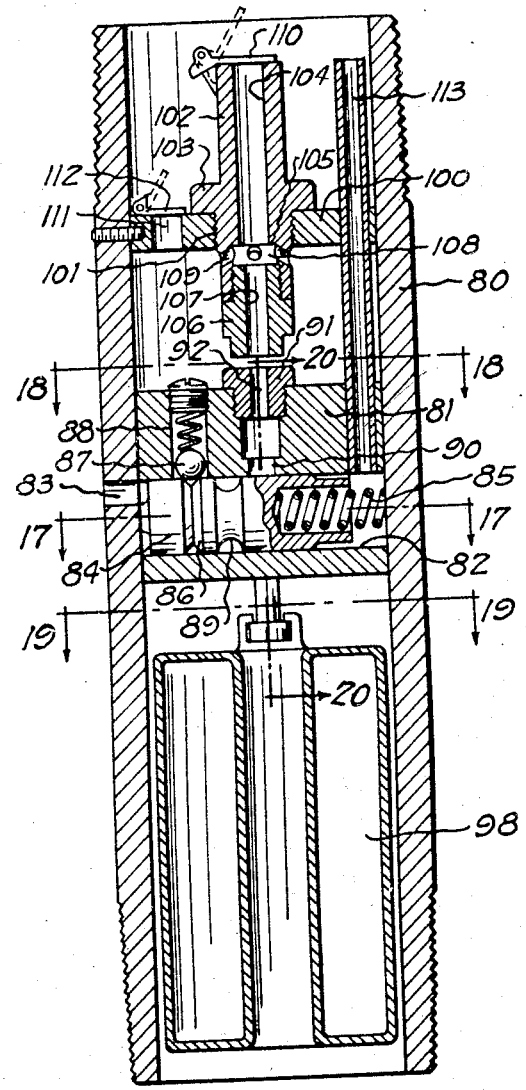
Figure 17:
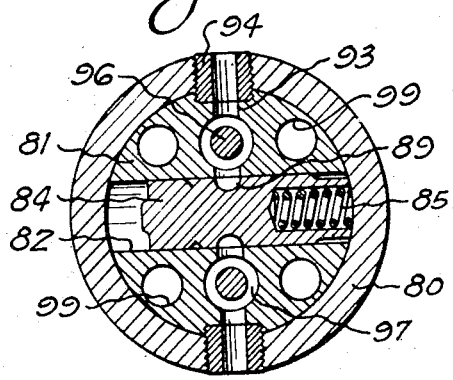
Figure 18:
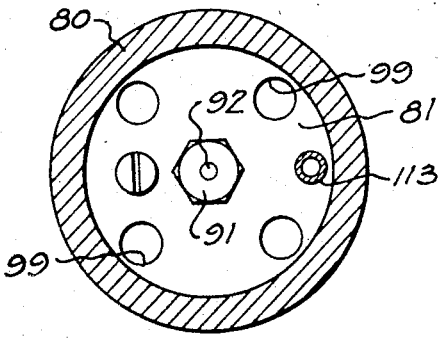
Figure 20:
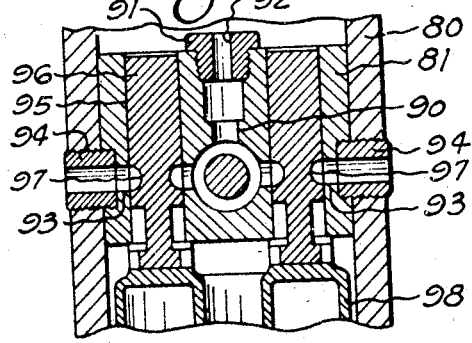
Figure 19:
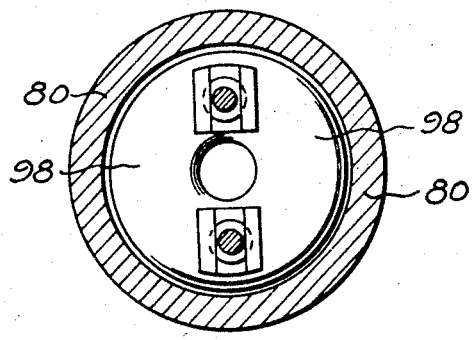
Figure 16:
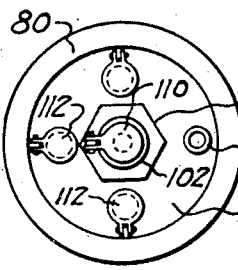

The invention will be more readily understood from a reading of the following specification and by reference to the accompanying drawings, in which an example of the invention is shown, and wherein:

Figure 1 is a view, partly in elevation and partly in section, and showing a tubing string having a plurality of flow devices, constructed in accordance with the invention, mounted therein, Figure 2 is a side elevation of the flow device, Figure 3 is a plan view thereof, Figure 4 is a horizontal, cross-sectional view, taken on the line 4—4 of Figure 2, Figure 5 is a horizontal, cross-sectional view, taken on the line 5—5 of Figure 2, Figure 6 is a transverse, vertical, sectional view taken on the line 6—6 of Figure 2, Figure 7 is a transverse, vertical, sectional view taken on the line 7—7 of Figure 3, and illustrating the valve plunger in its lowered position with the check valve open, Figure 8 is a similar view with the plunger raised and the check valve closed, Figure 9 is a similar view showing the plunger and the check in an intermediate position, Figure 10 is also a similar view with the check valve open and the plunger in an intermediate position, Figure 11 is a transverse, vertical, sectional view of the inlet tube assembly and taken on the line 11—11 of Figure 3, Figure 12 is an isometric view of the control plunger, Figure 13 is an isometric view of the admission tube assembly, Figure 14 is a partial isometric view of the valve sleeve which controls flow into the admission tube assembly, Figure 15 is a transverse, vertical, sectional view of a modified form of the invention, Figure 16 is a plan view of the parts shown in Figure 15, Figure 17 is a horizontal, cross-sectional view taken on the line 17—17 of Figure 15, Figure 18 is a horizontal, cross-sectional view taken on the line 18—18 of Figure 15, Figure 19 is a horizontal, cross-sectional view taken on the line 19—19 of Figure 15, and Figure 20 is a transverse, vertical, sectional view taken on the line 20—20 of Figure 15.

This application is filed as a continuation-in-part of prior application filed June 16, 1938, Serial No. 214,019, and now abandoned.

In the drawings, the numeral 10 designates an ordinary well casing which extends vertically through the well bore. A casing head 11 of any suitable construction is mounted on the upper end of the casing at the surface and is provided with the usual radially extending conductor 12, whereby communication with the interior of the casing may be established. The well tubing 13 extends axially through the well casing to the lower end of the well bore and has the usual well screen or perforated section of pipe 14 at its lower end. Immediately above the well screen a well packer 15 is adapted to be set, whereby the annular space between the well tubing and the well casing may be sealed off. It is pointed out that the packer is shown schematically and may be of any desired construction since it forms no part of the present invention.

In carrying out the invention, a plurality of flow devices A are connected in the tubing string at various elevations therein. A lifting fluid, such as gas or air under pressure, is introduced through the pipe 12 into the casing 10 and fills the annular space between the tubing and the casing above the packer 15. The flow devices A, as will be hereinafter explained, control the admittance of this lifting gas into the interior or bore of the well tubing 13, whereby the well fluid within said tubing may be lifted to the surface. Each flow device A is coupled in the tubing string by means of the usual coupling collars 16.

Each flow device A includes an elongate cylindrical housing 20 which has its upper and lower ends externally screw-threaded so as to receive the couplings 16. An elongate tubular body or cylinder 21 is preferably formed integral with the housing 20 and extends radially therefrom, as is clearly shown in Figures 3 and 4. A tubular sleeve 22 is also formed integral with the housing 20 and projects radially therefrom at an angle different from the angle at which the cylinder projects, whereby said sleeve is spaced from said cylinder. Located between the cylinder 21 and the sleeve 22 is a vertical, cylindrical float chamber 23, which, as is clearly shown in Figure 4, is preferably formed integral with the cylinder and with the sleeve. The upper ends of the cylinder 21 and the sleeve 22 are connected to the exterior surface of the housing 20 by inclined webs 24, which obviate the flow device hanging on couplings or other projections within the casing, as said device is lowered through the casing with the well tubing 13.

The cylinder 21 has a vertical bore 25 extending entirely therethrough and a tubular plunger 26 is slidable within the bore. Downward movement of the plunger within said bore is limited by an annular nut 27 which is threaded into the lower end of said bore and, obviously, when the plunger is in its lowermost position, as shown in Figure 7, the pressure exteriorly of the cylinder may act against the lower end of the plunger through the bore 28 of the nut 27. The upper end of the cylinder 21 is closed by a cap nut 29 and a coiled spring 30 is confined between this nut and the plunger 26. The axial bore 31 of the plunger terminates short of the lower end thereof and extends upwardly through said plunger to the upper end thereof. The upper portion of the bore 31 is enlarged to provide an annular shoulder 32 within the plunger and the lower end of the coiled spring 30 rests on this shoulder. Manifestly, the coiled spring constantly exerts its pressure to urge the plunger to its lowermost position, as shown in Figure 7. The lower end of the bore 31 of said plunger communicates with the exterior of said plunger through a radial port 33 and the external diameter of the plunger is reduced immediately adjacent said port, whereby an annular space 34 is formed between said plunger and the bore of the cylinder. When the plunger is in its lowermost position, the port 33 is substantially opposite a radial port 35 which extends through the wall of the housing 20 and into the bore of said housing. Therefore, when the plunger is in its lowermost position, communication may be established between the bore of said plunger and the bore of the housing and tubing 13 in which said housing is connected, as will be explained.

Above the passage 35, the bore of the housing 20 communicates with the bore 25 of the cylinder through a radial opening 36. Intermediate its ends, the plunger 26 is slotted as shown at 37 and this slot coacts with a valve disk or member 38, as will now be explained. The valve member 38 includes a split seating disk 39 which is secured to a transversely extending bar 40. The bar has one end extending through the opening 36 and is formed with a collar 41 through which a pivot pin or bolt 42 extends. Beyond the pin, the collar is formed with a lug 43 and this lug is disposed within the slot 37 of the plunger 26.

Manifestly, the valve disk 39 is pivotally mounted within the bore of the housing and when the plunger is in its lowermost position, as shown in Figure 7, the disk is swung upwardly into a recess 44 provided for receiving said disk. In this position, the disk is completely out of the bore and does not restrict a flow through the housing. When the plunger 26 is moved to its raised position, as shown in Figure 8, the lower end of the slot 37 acting against the lug 43 swings the valve disk downwardly across the bore of the housing 20. The valve disk 39 is adapted to engage an annular bevelled seat 45 formed within the interior of the housing 20 above the passage 35 and in substantial alinement with the opening 36. When the valve disk is in this position, the bore of the housing 20 is closed.

When the plunger 26 is in its lowermost position, its lower end is exposed to the pressure within the bore of the well casing 10. This pressure is that of the lifting fluid which has been introduced into said casing through the pipe 12 and when said pressure is sufficient to lift the plunger 26 against the tension of the coiled spring 30, said plunger moves upwardly to the position shown in Figure 8. In this position, the lower end of the plunger moves upwardly above a lateral gas inlet port 46. This port, as is clearly shown in Figures 2 and 5, extends from the bore 25 of the cylinder 21 into the bore 47 of the float chamber 23. Therefore, when the plunger is lifted to its uppermost position, the inlet port 46 is uncovered to permit a flow of the lifting gas into the bore of the cylinder 21 and then into the bore 47 of the float chamber 23. A lateral port 46a leads from the opposite side of the bore 47 of said float chamber to the bore of the sleeve 22, whereby the lifting gas may flow to the sleeve 22.

For controlling the flow of the lifting gas through the bore 47 of the float chamber 23, a piston valve 48 is slidable within the bore 47 (Figure 6). This piston valve is formed with an annular groove 49 which is located near its lower end and when said valve is in its raised position, this groove is alined with the ports 46 and 46a, whereby gas flowing through the port 46 may enter and pass around the annular groove 49 and then into the port 46a, from where it may flow to the interior of the sleeve 22. When the piston valve is in a lowered position, the annular groove or channel 49 is below the ports 46 and 46a and flow therebetween is shut off.

The upper end of the bore 47 is enlarged as shown at 50 and an elongate tubular float 51 is operable within the enlarged portion of said bore. The lower end of the float is connected by a link 52 with the piston valve and, manifestly, the position of the float within its chamber controls the position of the valve. The bore of the float chamber 23 communicates with the interior of the housing through a trio of passages 53, which are located at the upper and lower ends and intermediate said ends of the chamber. With this arrangement, the well liquids which rise within the tubing and enter the housing 20 may readily pass into the float chamber and thereby actuate said float. The provision of the ports 53 above and below the piston valve equalizes the pressure across said valve whereby when no liquid is present within the float chamber, the weight of the float and piston valve moves the latter to its lowered position. Also, equalization of pressures across the piston valve makes for easier movement of said valve since, under such conditions, the float need only lift the weight of the valve. When there is a liquid within the bore of the housing 20, such liquid is also present within the float chamber 23, with the result that the float is in its raised position. In such position, the piston valve 48 is raised and its groove 49 is alined with the gas inlet ports 46 and 46a. In such position, an operation of the plunger 26 which raises said plunger to its uppermost position, permits a flow of lifting gas from the casing 10 through the ports 46 and 46a and into the sleeve 22. Manifestly, if there is no liquid within the bore of the housing 20, the float is in its lowered position and the piston valve is also lowered, whereby its annular groove 49 is misalined with the inlet ports 46 and 46a. In such position, there can be no flow of lifting gas into the sleeve 22. Therefore, the provision of the float and its valve 48 assure that a liquid will be present within the housing 20 before any lifting gas can be admitted thereto.

The inlet port 46a communicates with the lower end of the bore 54 of the sleeve 22. The bore 54 extends axially throughout the length of said sleeve. A gas admitting or delivery tube assembly B is mounted within the bore 54 of the sleeve 22. This assembly includes a lower jet plug 55 which is insertable within the bore. The plug is formed with an external annular flange 56 which abuts the lower end of the sleeve and limits the upward movement thereinto. The intermediate portion of the outer surface of the plug is reduced to provide an annular passage or channel 57 between the outer surface of said plug and the bore 54 of the sleeve. This channel is located opposite the inlet port 46a, whereby the gas entering the bore of the sleeve 22 enters the channel 57. A diametrically extending passage 58 is formed in the plug and this passage communicates with the annular space 57. A reduced axial duct 59 extends upwardly from the transverse passage 58 to the upper end of the plug 55. With this arrangement, it will be seen that the incoming or admitted gas may flow into the lateral passage 58 and then upwardly through the reduced duct 59.

A second jet plug 60 is threaded onto the upper end of the plug 55 and the lower end of the bore of this plug is enlarged, whereby an internal shoulder 61 is formed therein. When the plug 60 is screwed onto the plug 55, the shoulder 61 is spaced from the top of the plug 55 so as to provide a chamber 62 immediately above the upper end of the plug 55. A plurality of radial orifices 63 are provided in the plug 60 and communicate with the chamber 62. The external diameter of the plug 60 is less than the diameter of the bore 54 of the sleeve, whereby an annular space S is provided around the plug 60. This annular space communicates with the bore of the housing 20 through a radial port 64, whereby well liquids from the interior of the housing may enter the bore of the sleeve around the plug 60.

The admitted gas which flows upwardly through the reduced duct 59 of the plug 55 enters the chamber and passes upwardly therethrough, escaping therefrom through an axial duct 65 which is formed in the plug 60 and which extends upwardly from the chamber 62. The duct 65 is of a slightly larger diameter than the duct 59, whereby no restriction of the upwardly flowing gas is produced. It will be obvious that since the gas is entering under a relatively high pressure, this gas flowing upwardly through the duct 59 and through the duct 65 will create a suction in the chamber 62.

Connected to the upper plug 60 is an elongate tube 66, which is formed with an axial bore 67. The lower end of the bore is enlarged to form an annular shoulder within the tube and this shoulder is normally spaced from the top of the plug 60, whereby a chamber 69 is formed immediately above said plug. This chamber is similar to the chamber 62 formed within the plug 60 and has a plurality of radial orifices 70 communicating therewith. As the gas flows upwardly through the axial duct 65, it enters the bore 67 of the tube 66. This upwardly flowing gas, through its jetting action, creates a suction in the chamber 69.

From the foregoing, it will be obvious that the admitted lifting gas which flows upwardly through the plugs 55 and 60 and the tube 66 creates a suction within the chambers 62 and 69. When the orifices 63 and 70, leading from said chambers, are open, this suction serves to draw the well liquids from the bore of the body through the port 64, annular space S, and through said orifices into the chambers 62 and 69. These well liquids are admixed with the upwardly moving gas and pass upwardly through the bore 67 of the tube.

For controlling the flow through the orifices and to hold said orifices closed until the suction created by the gas flowing upwardly through the delivery tube assembly is sufficient to draw well liquids from the well tubing string, whereby the gas will not flow through the orifices 69 and 73 and downwardly through the tubing string, a valve sleeve 70a surrounds the plug 66 and lower end of the tube 66, being disposed within the annular space S. This sleeve is clearly shown in Figure 14 and is provided with an annular groove 70b at the upper end of its bore. This groove communicates through radial openings 70c with vertical grooves 70d which are formed in the outer surface of the sleeve. Depending legs 70e are formed on the lower end of the sleeve and normally rest on the external shoulder of the plug 55 to hold the lower end of the sleeve above the port 64.

The weight of the sleeve maintains the same in its lower position, as shown in Figure 11, in which position the orifices 63 are covered, while the orifices 70 are uncovered. These latter orifices do not communicate with the port 64 because the sleeve 70a is within the annular space S. As gas is admitted to the admission or delivery tube assembly, a suction is created in the chambers 62 and 69 but no well liquids are drawn into the assembly since the sleeve 70a is in its lower position. As the suction builds up, due to increased velocity, this suction acts on the upper end of the sleeve 70a and serves to lift the same, whereby the lower orifices 63 are uncovered and the upper orifices 70 are registered with the internal groove 70b of said sleeve. In such position, the suction acts on the well liquid in the bore of the tubing string and draws said liquid into the delivery tube assembly. This liquid is admixed with the gas and is forced upwardly through the bore 67 of the tube.

The upper end of the bore of said tube is enlarged to provide an internal annular shoulder 71 and normally a ball 72 is seated on this shoulder. The upwardly flowing gas, having the well liquids which have been drawn into the gas stream admixed therewith, will strike the ball 72 and unseat the same, forcing said ball upwardly to the top of the tube and into contact with a plug 73 which closes said tube.

From the upper end of the tube 66, the gas and well liquids will escape through radial openings 74 provided in the tube. After passing through the openings 74, the gas having the well liquids admixed therewith will flow through a plurality of inlet ports 75 which establish communication between the bore of the sleeve 22 and the bore of the housing 20. In this manner, it will be obvious that the upwardly flowing gas draws the well liquids from the housing through the port 64, carries it through the assembly B and ejects it through the openings 75 into the bore of the housing. It is pointed out that the port 64 is below the valve seat 45 on which the disk 39 seats, while the openings 75 are above said seat.

In the operation of the device, the control plunger 26 and the check valve 38 are in the position shown in Figure 7. It will be assumed that, at this time, there is no gas in the well casing and the coiled spring 30 has moved the plunger 26 to its lowermost position. Such movement of the plunger has caused the valve disk 38 to be swung upwardly due to the connection between the lug 43 and the slot 37. It will also be assumed that the liquid has risen in the well tubing 13 and is within the housing 20. This well liquid will enter the port 53 of the float chamber 23, causing said float to rise to its uppermost position (Figure 6) and moving the piston valve 48 upwardly so that its channel 49 is alined with the gas inlet ports 46 and 46a.

The lifting gas under a suitable pressure is introduced through the pipe 12 into the bore of the well casing 10 and flows downwardly within said casing. When the pressure of the lifting gas within the casing reaches a point sufficient to overcome the tension of the spring 30, said gas will impart an upward movement to the plunger 26, moving said plunger to the position shown in Figure 8. Such upward movement of the plunger 26 swings the valve disk 39 downwardly into engagement with its seat 45, whereby the bore of the housing 20 is closed. Upward movement of the plunger 26 also uncovers the gas inlet port 46 and said gas may flow through said port.

Since the float is holding the piston valve 48 in a raised position, the gas flowing through the port 46 enters the annular channel 49 in the valve 48 and passes into the port 46a. From this port, the gas flows into the annular channel 57 (Figure 11) which is formed around the plug 55 in the lower end of the bore of the sleeve 22. From this annular space, the gas enters the diametrically extending passage 58 and then flows upwardly through the duct 59 and duct 65 and into and through the bore 67 of the tube 66. The upwardly flowing gas, which is under a relatively high pressure, produces a jetting action which creates a suction at the orifices 63 and 70, which orifices are normally out of communication with the well tubing because of the lowered position of the valve sleeve 70a. When the suction created reaches a predetermined point, the sleeve 70a is lifted, whereby well liquids are drawn from the bore of the housing through the port 64, orifices 63 and 70, and into the bore 67 of the tube 66. It is noted that the well liquids which are drawn into the assembly B are those which are below the closed check valve 38. These liquids are then ejected from the tube through the openings 74 and are then admitted into the housing 20 above the check valve 38 through the ports 75. In this manner, the lifting gas acts to draw the well liquids from below the check valve and to force them upwardly above the check valve. The assembly B provides a by-pass for the well liquids to flow around the closed check valve.

It is pointed out that through the jetting action the liquids are drawn into the assembly B and are then ejected upwardly and lifted to the surface through the well tubing 13. By utilizing a suction, it is obvious that the liquids are pulled from the tubing rather than pushed upwardly therethrough. This action facilitates starting of the flow and requires less gas to begin the movement of the liquid column.

In the event that the well liquid below the check valve 38 is under a sufficient pressure to flow upwardly without the aid of the auxiliary lifting gas, such pressure will obviously act against the underside of the valve 38. This pressure will be sufficient to unseat the valve 38, as shown in Figure 9, whereby said valve is moved upwardly a sufficient distance to permit the well liquids to flow upwardly thereby. The upward swinging of the check valve will cause the lug 43 on said valve, acting on the slot 37 in the plunger 26, to move said plunger downwardly a sufficient distance to close the gas inlet port 46, whereby the admission of additional gas is cut off. Thus, it will be seen that if the well liquids are under a sufficient pressure to flow normally then the gas is automatically cut off and the check valve is raised to permit such normal upward flow.

When the well liquid below the valve has been lifted, said liquid will of course have been emptied from the float chamber 23. Such emptying of the float chamber will cause the float 51 to move downwardly, whereby its piston valve 48 is moved downwardly to misaline the channel 49 with the inlet ports 46 and 46a. Such misalinement of the ports will immediately shut off the gas supply and no further gas will be admitted into the tubing until such time as the liquid column therein has again built up and has entered the float chamber to again raise the float 51.

When it is desired to shut down the flow, it is only necessary to relieve the pressure within the well casing sufficiently to permit the coiled spring 30 to lower the control plunger 26 to the position shown in Figure 10. The plunger will not move to its completely lowered position, as shown in Figure 7, because in all probability, there will be a liquid column above the check valve 38 which is closed and such liquid column will be holding said check in such closed position. The spring 30 will be insufficient to lift said check against the weight of such column. When the parts are in this position, with the gas pressure in the casing relieved, the liquid above the check valve may flow downwardly through the openings 36 within which the pivot pin 42 of said valve is mounted. This liquid will then enter the bore 25 of the cylinder 21, such entrance being permitted because the reduced portion of the plunger 26 is opposite the opening 36. Thus the liquid above the check valve may pass downwardly into the bore of the cylinder 21 and then flow back into the housing 20 below the check valve through the radial passage 35 which communicates with the lower portion of the cylinder bore. After the lifting gas pressure has been relieved for some time, all of the liquid above the check valve will flow downwardly around said check, or the pressure above and below will be equalized. When such equalization occurs, the coiled spring 30, being sufficient to swing the weight of the check, will swing said check to the position shown in Figure 7, moving the plunger 26 to its lowermost position. The device is now ready for the next operation when the lifting gas is again introduced into the casing. From the above, it will be seen that a simple and efficient device for controlling the admission of a lifting gas into the well liquid in the tubing 13 is provided. The plunger 26, which controls the admission of gas to the sleeve 22, is actuated solely by the pressure of the lifting gas acting against its lower end, the movement of the plunger being resisted by the coiled spring 30. The pressure of the well liquid does not enter into the operation of the plunger and, therefore, by varying the pressure of the spring 30, an accurate control of the point at which gas is admitted may be had. It is pointed out that it might be possible to eliminate the float 51, together with its piston valve 48. In this case, the entire float chamber 23 would be omitted and the passages 46 and 46a connected to each other. The float may be eliminated in wells where there is a constant flow of well liquid upwardly in the well tubing due to the natural conditions of the well. In this type of well, the well liquid may be at a level a few hundred feet below the surface and, although the conditions of the well raise the liquid to such level, they are insufficient to bring said liquid completely to the surface. In such event, there would always be the well liquid within the housing 20 and there would be no necessity of providing the float. In this instance, gas would be constantly admitted to the well tubing through each flow device A, except where the well liquid is moving sufficiently fast upwardly through the tubing to lift the check 38, in which event said check would move the plunger to its lowermost position to shut off the gas from this particular flow device, as has been explained.

In Figures 15 to 19, a modified form of the invention is shown. This form includes an elongate cylindrical housing 80 which has its upper and lower ends externally screw-threaded, whereby it may be readily connected by the coupling collars 16 in the well tubing string 13. All of the control mechanism is housed or mounted within the housing and, as clearly shown in Figure 15, a cylindrical block 81 is mounted intermediate the ends of said housing. A diametrically extending bore 82 is formed within the lower portion of the block 81 and one end of the bore communicates with the exterior of the housing 80 through a radial port or opening 83. A control plunger or piston 84 is slidably mounted within the bore 82 and a coiled spring 85, which is confined between the wall of the housing 80 and one end of the piston, constantly urges said piston toward the port or opening 83. The piston is provided with an annular groove 86 which is arranged to be engaged by a spring-pressed ball 87 which is mounted within a vertical opening 88 provided in the block 81. When the ball is engaging the groove 86, the piston is frictionally locked against movement in the bore. In order to move the piston, it is necessary that the frictional pressure of the ball 87, together with the resistance of the spring 85, be overcome. The provision of the ball provides for a snap action or sudden movement of the piston. Adjacent the groove 86, the exterior surface of the piston is formed with an annular groove or recess 89 which extends completely therearound.

When the piston is moved inwardly of the bore 82, the annular channel or groove 89 is adapted to register with an axial vertical bore 90 which extends upwardly through the block 81 from the bore 82. A plug 91 closes the upper end of the bore 90 and is provided with a reduced axial duct 92 which extends therethrough.

The lifting gas from the casing 10 is arranged to pass to the axial bore 90 in the block through a pair of diametrically opposite inlet openings 93, which openings are provided in the block 81 and are located at a right angle to the diametrically extending bore 82 (Figure 19). An inlet collar 94 is threaded through the wall of the housing 80 and engages in the outer portion of each inlet port 93 and said collar provides a means for holding the block 81 in proper position within the housing. Each inlet port or passage 93 is intersected by a vertical bore or passage 95 within which a piston valve 96 is movable. The valve 96 is formed with an annular channel or groove 97 which is located near its lower end and said valve has connection with an annular float 98 which is slidable within the housing below the block 81. When the float 98 is in its uppermost position, the piston valves 96 are in their uppermost position as shown in Figure 20. In such position, the groove 97 of each valve communicates or is in alinement with its inlet port 93, whereby the gas from the casing may enter the port and flow around the channel 97 in the valve. From the channel, the gas flows to the inner end of each port 93 and then into the bore 82 with which said port communicates. It is pointed out that the inlet ports 93 are in the same vertical plane as the axial bore 90 and, therefore, when the piston has moved inwardly, to aline its annular groove 89 with the axial bore 90, said groove is also alined with the inlet ports 93. Thus, with the parts in the position shown in Figure 20, the lifting gas from the casing may flow through the inlet ports 93, around the valve members 96 and into the bore 82 of the cylinder, then through the annular groove 89 in the piston and upwardly through the bore 90 and duct 92. Of course, if the piston is in its outer position, its groove 89 is misalined with the bore 90 and the inlet ports 93, with the result that the gas is shut off. Also, if the float is in a lowered position, the grooves 97 of the piston valves 96 are misalined with the ports 93, whereby the flow of gas through said ports is prevented.

The well liquid in the tubing will, of course, rise upwardly into the bore of the housing 80 and will act upon the annular float 98. This liquid will then flow upwardly through a plurality of vertical passages 99 which are formed in the block 81, whereby said liquid may enter the space above said block. It is noted that when the liquid is at a level even with the block 81 or thereabove, the float 98 is in its uppermost position, with the piston valves 96 in their uppermost position to allow a flow of the lifting gas through the inlet ports 93.

A transverse partition 100 is suitably secured within the bore of the housing 80 and is spaced above the upper surface of the block 81. This partition is formed with an axial opening 101 which has an elongate tube 102 mounted therein. It is preferable that screw threads be formed on the exterior of the tube, whereby the same may be threaded into the partition and an external annular flange 103 on said tube limits the downward movement thereof. The tube is formed with an axial bore 104 which extends entirely therethrough and the lower end of this bore is enlarged to provide an internal annular shoulder 105 within the bore of said tube. The extreme lower end of the bore of the tube 102 is screw-threaded and receives a plug 106, which plug is provided with an axial duct 107 extending entirely therethrough. The upper end of the plug 106 is spaced from the shoulder 105 within the tube, whereby a chamber 108 is formed above the plug. A plurality of orifices 109 extend radially through the wall of the tube and communicate with the chamber 108. The lower end of the plug 106 is spaced a slight distance from the plug 91 which is mounted in the upper end of the axial bore 90 of the block 81. A flap valve 110 is pivoted to the upper end of the tube and is adapted to close the bore 104 thereof.

In the operation of this form, it will be assumed that the parts are in the position shown in Figure 15. As the well liquid rises within the tubing and within the housing 80, the float valve is moved to its uppermost position to aline the annular grooves 97 of its piston valves 96 with the inlet ports 93. The gas pressure in the well casing is gradually built up to a predetermined pressure until said gas pressure moves the piston under tension of the spring 85 and also under the frictional engagement of the ball 87 with the groove 88 of said piston. This pressure acts against the end of the piston through the ports 83, as has been explained. When the piston moves inwardly, its annular channel or groove 89 is alined with the axial bore 90 of the block, as well as with the inner ends of the inlet ports 93. Since the piston valves 96 have been previously moved to their uppermost position, the lifting gas may enter the inlet ports 93 and flow into the annular groove 89 in the piston. From this point, the gas flows upwardly through the axial bore 90 of the block 81, then through the bore of the plug 106 and finally through the bore of the tube 102.

Since the lower end of the plug 106 is spaced from the plug 91, a jetting action is created at this point, whereby the well liquids are sucked into the bore 107 of the plug by the upwardly moving lifting gas. A second jetting action is created at the orifices 109 and additional well liquid is pulled into the bore of the tube 102. This well liquid is admixed with the upwardly moving lifting gas and, manifestly, the flap valve 110 will be opened to permit the fluid to rise upwardly through the well tubing above the housing 80. The operation is substantially the same as in the first form.

In the event that a certain head of well liquid flows upwardly through the well tubing and through the passages 99 in the block 81, it is probable that the bore of the tube 102 is insufficient to take care of this increased amount of well fluid. In such instance, the well fluid or liquid will pass upwardly through a plurality of ports 111 which are formed in the partition 100. These ports are normally closed by flap valves 112 which will, of course, be lifted by the upwardly flowing well liquid. Thus, it will be seen that in the event certain heading of the well should occur, the well liquid may pass upwardly through the ports 111 and need not pass through the tube assembly.

After the well liquid has been lifted above the partition 100, said liquid cannot fall downwardly through the housing because the flap valves 110 and 112 will automatically close. In this manner, once the well liquid is lifted to a given level, said liquid will remain at such level until additional lifting gas is introduced. It is pointed out that under normal flowing conditions, the well liquid is carried up through the tube assembly and forced upwardly through the tubing above the housing 80. It is only when an excess amount of fluid under an excessive pressure passes into the housing that said well liquid flows upwardly through the ports 111 in the partition 100. In order to facilitate operation of the piston 84, which controls the admission of the lifting gas, a suitable elongate vent tube 113 may extend upwardly from one end of the bore 82, through the partition 100 and into the upper portion of the housing 80. The operation and advantages of the modified form are substantially the same as those of the first form, hereinbefore described. Of course, all of the control mechanism is mounted within the bore of the housing and the well liquid is by-passed around said mechanism through the passages 99. In the first form, the control mechanism, including the plunger 26, and the admission tube assembly B, is located outside of the bore of the housing 20.

The foregoing description of the invention is explanatory thereof and various changes in the size, shape and materials, as well as in the details of the illustrated construction, may be made, within the scope of the appended claims, without departing from the spirit of the invention.

What I claim and desire to secure by Letters Patent is:

1. A flow device including, a well tubing, a tubular housing adapted to be connected in the well tubing and having a gas inlet, an admission tube assembly within said inlet for introducing the gas into the tubing, said assembly having means establishing communication with the interior of the housing whereby liquid is drawn from the tubing by the gas flowing through the assembly, means at the upper end of the assembly establishing communication between the assembly and tubing thereabove, whereby the liquid is carried through the assembly and ejected back into the tubing with the inflowing gas, and a spring-pressed plunger also disposed within the gas inlet for controlling the admittance of the lifting gas into said assembly.

2. A flow device including, a well tubing, a tubular housing adapted to be connected in the well tubing and having a gas inlet passage, means below the point of admission of the gas into the housing for closing the bore of said housing, an admission tube assembly within the inlet passage for conducting the gas into the tubing above the closure means, said assembly having means for establishing communication with the interior of the housing below said closure means, whereby the gas flowing through the assembly will act upon the well liquid to draw said liquid from the tubing and cause it to by-pass the closure and flow through the assembly, means establishing communication between the assembly and tubing above the closure whereby the liquid flowing through said assembly is directed back into the tubing above said closure, and a spring-pressed plunger for controlling the admittance of the lifting gas to the inlet passage and tube assembly.

3. A flow device including, a well tubing, a tubular housing adapted to be connected in the well tubing and having a gas inlet passage, means below the point of admission of the gas into the housing for closing the bore of said housing, an admission tube assembly within the inlet passage for conducting the gas into the tubing above the closure means, said assembly having means for establishing communication with the interior of the housing below said closure means, whereby the gas flowing through the assembly will act upon the well liquid to draw said liquid from the tubing and cause it to by-pass the closure and flow through the assembly, means establishing communication between the assembly and tubing above the closure whereby the liquid flowing through said assembly is directed back into the tubing above said closure, a spring-pressed plunger for controlling the admittance of the lifting gas to the inlet passage and tube assembly, and means for connecting the plunger with the closure means, whereby said means is closed when the plunger is in a position permitting admittance of gas to the inlet passage.

4. A flow device including, a wall tubing, a tubular housing adapted to be connected in the well tubing and having a gas inlet passage, means below the point of admission of the gas into the housing for closing the bore of said housing, an admission tube assembly within the inlet passage for conducting the gas into the tubing above the closure means, said assembly having means for establishing communication with the interior of the housing below said closure means, whereby the gas flowing through the assembly will act upon the well liquid to draw said liquid from the tubing and cause it to by-pass the closure and flow through the assembly, means establishing communication between the assembly and tubing above the closure whereby the liquid flowing through said assembly is directed back into the tubing above said closure, a spring-pressed plunger for controlling the admittance of the lifting gas to the inlet passage and tube assembly, and means for connecting the plunger with the closure means, whereby said means is closed when the plunger is in a position permitting admittance of gas to the inlet passage, said closure being capable of being swung upwardly by the well liquid therebelow to allow upward flow of said liquid thereby when said liquid has sufficient pressure to flow without the aid of additional lifting gas, such swinging of the closure moving the plunger to shut off the admittance of gas.

5. A flow device including, a well tubing, a tubular housing adapted to be connected in the well tubing and having a gas inlet passage, means below the point of admission of the gas into the housing for closing the bore of said housing, an admission tube assembly within the inlet passage for conducting the gas into the tubing above the closure means, said assembly having means for establishing communication with the interior of the housing below said closure means, whereby the gas flowing through the assembly will act upon the well liquid to draw said liquid from the tubing and cause it to by-pass the closure and flow through the assembly, means establishing communication between the assembly and tubing above the closure whereby the liquid flowing through said assembly is directed back into the tubing above said closure, a spring-pressed plunger for controlling the admittance of the lifting gas to the inlet passage and tube assembly, and a float operated valve located in the inlet passage between the plunger and the tube assembly and subject to the well liquid in the housing for automatically closing said passage to prevent admission of gas when no liquid is present in the housing.

6. A flow device including, a well tubing, a tubular housing adapted to be connected in the well tubing and having a gas inlet passage, means below the point of admission of the gas into the housing for closing the bore of said housing, an admission tube assembly within the inlet passage for conducting the gas into the tubing above the closure means, said assembly having means for establishing communication with the interior of the housing below said closure means, whereby the gas flowing through the assembly will act upon the well liquid to draw said liquid from the tubing and cause it to by-pass the closure and flow through the assembly, means establishing communication between the assembly and tubing above the closure whereby the liquid flowing through said assembly is directed back into the tubing above said closure, a spring-pressed plunger for controlling the admittance of the lifting gas to the inlet passage and tube assembly, means for connecting the plunger with the closure means, whereby said means is closed when the plunger is in a position permitting admittance of gas to the inlet passage, and a float operated valve located in the inlet passage between the plunger and the tube assembly and subject to the well liquid in the housing for automatically closing said passage to prevent admission of gas when no liquid is present in the housing.

7. A flow device including, a well tubing, a tubular housing adapted to be connected in the well tubing and having a gas inlet passage, means below the point of admission of the gas into the housing for closing the bore of said housing, an admission tube assembly within the inlet passage for conducting the gas into the tubing above the closure means, said assembly having means for establishing communication with the interior of the housing below said closure means, means in the assembly for increasing the velocity of the gas so that said gas flows through the assembly at a relatively high velocity, whereby the gas flowing through the assembly will act upon the well liquid to draw said liquid from the tubing and cause it to by-pass the closure and flow through the assembly, means establishing communication between the assembly and tubing above the closure whereby the liquid flowing through said assembly is directed back into the tubing above said closure, and a spring-pressed plunger for controlling the admittance of the lifting gas to the inlet passage and tube assembly, said plunger having one end thereof exposed to the gas pressure, whereby it is moved to an open position when the gas reaches a predetermined pressure sufficient to overcome the resistance of the spring.

8. A flow device including, a well tubing, a tubular housing adapted to be connected in the well tubing and having a gas inlet passage, means below the point of admission of the gas into the housing for closing the bore of said housing, an admission tube assembly within the inlet passage for conducting the gas into the tubing above the closure means, said assembly having means for establishing communication with the interior of the housing below said closure means, means in the assembly for increasing the velocity of the gas so that said gas flows through the assembly at a relatively high velocity, whereby the gas flowing through the assembly will act upon the well liquid to draw said liquid from the tubing and cause it to by-pass the closure and flow through the assembly, means establishing communication between the assembly and tubing above the closure whereby the liquid flowing through said assembly is directed back into the tubing above said closure, a spring-pressed plunger for controlling the admittance of the lifting gas to the inlet passage and tube assembly, said plunger having one end thereof exposed to the gas pressure, whereby it is moved to an open position when the gas reaches a predetermined pressure sufficient to overcome the resistance of the spring, and means for connecting the plunger with the closure means, whereby said means is closed when the plunger is in a position permitting admittance of gas to the inlet passage.

9. A flow device including, a well tubing, a tubular housing adapted to be connected in the well tubing and having a gas inlet passage, means below the point of admission of the gas into the housing for closing the bore of said housing, an admission tube assembly within the inlet passage for conducting the gas into the tubing above the closure means, said assembly having means for establishing communication with the interior of the housing below said closure means, means in the assembly for increasing the velocity of the gas so that said gas flows through the assembly at a relatively high velocity, whereby the gas flowing through the assembly will act upon the well liquid to draw said liquid from the tubing and cause it to by-pass the closure and flow through the assembly, means establishing communication between the assembly and tubing above the closure whereby the liquid flowing through said assembly is directed back into the tubing above said closure, a spring-pressed plunger for controlling the admittance of the lifting gas to the inlet passage and tube assembly, said plunger having one end thereof exposed to the gas pressure, whereby it is moved to an open position when the gas reaches a predetermined pressure sufficient to overcome the resistance of the spring, means for connecting the plunger with the closure means, whereby said means is closed when the plunger is in a position permitting admittance of gas to the inlet passage and also whereby when said closure means is swung by the well liquid pressure therebeneath the plunger is moved to shut off the gas, and means for equalizing the pressures on each side of the closure means when the gas pressure outside the housing is relieved, whereby said closure may be swung to an open position by the spring-pressed plunger to open the bore of the housing.

10. A flow device including, a well tubing, a tubular housing adapted to be connected in the well tubing and having a gas inlet passage, a closure below the point of admission of the gas into the housing for closing the bore of said housing, an admission tube assembly in the passage for conducting the lifting gas into the tubing above the closure, said assembly having communication with the interior of the tubing below the closure and having means therein for creating a suction in the tubing below the closure to draw the well liquid from the interior of the housing into and through the assembly, means for establishing communication between the assembly and housing above the closure whereby the liquid is directed outwardly into the housing above the closure, and a spring-pressed plunger for controlling the admittance of the lifting gas into the passage and tube assembly.

11. A flow device including, a well tubing, a tubular housing adapted to be connected in the well tubing and having a gas inlet passage, a closure below the point of admission of the gas into the housing for closing the bore of said housing, an admission tube assembly in the passage for conducting the lifting gas into the tubing above the closure, said assembly having communication with the interior of the tubing below the closure and having means therein for creating a suction in the tubing below the closure to draw the well liquid from the interior of the housing into and through the assembly, means for establishing communication between the assembly and housing above the closure whereby the liquid is directed outwardly into the housing above the closure, and a spring-pressed plunger for controlling the admittance of the lifting gas to the inlet passage and tube assembly, said plunger having one end thereof exposed to the gas pressure, whereby it is moved to an open position when the gas reaches a predetermined pressure sufficient to overcome the resistance of the spring.

12. A flow device including, a well tubing, a tubular housing adapted to be connected in the well tubing and having a gas inlet passage, a closure below the point of admission of the gas into the housing for closing the bore of said housing, an admission tube assembly in the passage for conducting the lifting gas into the tubing above the closure, said assembly having communication with the interior of the tubing below the closure and having means therein for creating a suction in the tubing below the closure to draw the well liquid from the interior of the housing into and through the assembly, means for establishing communication between the assembly and housing above the closure whereby the liquid is directed outwardly into the housing above the closure, a spring-pressed plunger for controlling the admittance of the lifting gas to the inlet passage and tube assembly, said plunger having one end thereof exposed to the gas pressure, whereby it is moved to an open position when the gas reaches a predetermined pressure sufficient to overcome the resistance of the spring, means for connecting the plunger with the closure means, whereby said means is closed when the plunger is in a position permitting admittance of gas to the inlet passage and also whereby when said closure means is swung by the well liquid pressure therebeneath the plunger is moved to shut off the gas, and means for equalizing the pressures on each side of the closure means when the gas pressure outside the housing is relieved, whereby said closure may be swung to an open position by the spring-pressed plunger to open the bore of the housing.

13. A flow device including, a well tubing, a tubular housing adapted to be connected in the well tubing and having a gas inlet passage, a closure below the point of admission of the gas into the housing for closing the bore of said housing, an admission tube assembly in the passage for conducting the lifting gas into the tubing above the closure, said assembly having communication with the interior of the tubing below the closure and having means for creating a suction in the tubing below the closure to draw the well liquid from the interior of the housing into and through the assembly, means for establishing communication between the assembly and housing above the closure whereby the liquid is directed outwardly into the housing above the closure, a spring-pressed plunger for controlling the admittance of the lifting gas into the passage and tube assembly, and a float operated valve located in the inlet passage between the plunger and the tube assembly and subject to the well liquid in the housing for automatically closing said passage to prevent admission of gas when no liquid is present in the housing.

14. A flow device including, a well tubing, a tubular housing adapted to be connected in the well tubing and having a gas inlet port, a swinging check valve mounted within the housing below the inlet port for closing the bore of the housing, an elongate sleeve mounted on the exterior of the housing and having the upper end of its bore communicating with the interior of the housing through the gas inlet port, an admission tube assembly mounted within the sleeve, means for establishing communication between the lower end of the bore of the sleeve and the interior of the housing below the check valve, a jet arrangement within the assembly whereby gas flowing through the assembly creates a suction in the tubing below the check valve and causes well liquid from below the check valve to flow through the assembly to by-pass said valve, and a spring-pressed plunger for controlling the admittance of the lifting gas to the tube assembly.

15. A flow device including, a well tubing, a tubular housing adapted to be connected in the well tubing and having a gas inlet port, a swinging check valve mounted within the housing below the inlet port for closing the bore of the housing, an elongate sleeve mounted on the exterior of the housing and having the upper end of its bore communicating with the interior of the housing through the gas inlet port, an admission tube assembly mounted within the sleeve, means for establishing communication between the lower end of the bore of the sleeve and the interior of the housing below the check valve, a jet arrangement within the assembly whereby gas flowing through the assembly creates a suction in the tubing below the check valve and causes well liquid from below the check valve to flow through the assembly to by-pass said valve, a spring-pressed plunger for controlling the admittance of the lifting gas to the tube assembly, and means for connecting the plunger to the check valve whereby the valve is closed when the plunger is in position admitting the lifting gas to the assembly and also whereby the admittance of gas is shut off when the check is swung to an open position.

16. A flow device including, a well tubing, a tubular housing adapted to be connected in the well tubing and having a gas inlet port, a swinging check valve mounted within the housing below the inlet port for closing the bore of the housing, an elongate sleeve mounted on the exterior of the housing and having the upper end of its bore communicating with the interior of the housing through the gas inlet port, an admission tube assembly mounted within the sleeve, means for establishing communication between the lower end of the bore of the sleeve and the interior of the housing below the check valve, a jet arrangement within the assembly whereby gas flowing through the assembly creates a suction in the tubing below the check valve and causes well liquid from below the check valve to flow through the assembly to by-pass said valve, a spring-pressed plunger for controlling the admittance of the lifting gas to the tube assembly, and a float operated valve located in the inlet passage between the plunger and the tube assembly and subject to the well liquid in the housing for automatically closing said passage to prevent admission of gas when no liquid is present in the housing.

17. A flow device including, a well tubing, a tubular housing connected in the tubing, a block mounted in the bore of said housing and having a lifting gas inlet passage, an admission tube assembly extending upwardly from the block and communicating with the passage for conducting gas into the housing at a relatively high velocity to create a suction above the block, means for by-passing the well liquid through the block, whereby the suction created by the gas flowing through the tube assembly may lift the well liquid through the tubing, and a spring-pressed plunger having one end exposed to the lifting gas for controlling the flow of gas through the inlet passage.

18. A flow device including, a well tubing, a tubular housing connected in the tubing, a block mounted in the bore of said housing and having a lifting gas inlet passage, an admission tube assembly extending upwardly from the block and communicating with the passage for conducting gas into the housing at a relatively high velocity to create a suction above the block, means for by-passing the well liquid through the block, whereby the suction created by the gas flowing through the tube assembly may lift the well liquid through the tubing, a spring-pressed plunger having one end exposed to the lifting gas for controlling the flow of gas through the inlet passage, and a float operated valve in the gas inlet passage for closing said passage when no fluid is present in the interior of the housing.

19. A fluid lifting apparatus including, a well tubing, a tubular housing adapted to be connected in the well tubing and having a gas inlet passage, an admission tube assembly within the inlet passage for conducting the gas into the tubing, said assembly having its lower end in direct communication with the interior of the well tubing, and also having its upper end communicating with the tubing a spring-pressed plunger in the passage beyond the tube assembly for controlling the admittance of the lifting gas through the passage and to the assembly, and a float operated valve disposed in the inlet passage between the plunger and assembly for shutting off the gas supply when the liquid in the housing falls below a predetermined level.

20. A flow device including, a well tubing, a tubular housing adapted to be connected in the well tubing and having a gas inlet passage, means below the point of admission of the gas into the housing for closing the bore of said housing, an admission tube assembly within the inlet passage for conducting the gas into the tubing above the closure means, said assembly having means for establishing communication with the interior of the housing below said closure means, whereby the gas flowing through the assembly will act upon the well liquid to draw said liquid from the tubing and cause it to by-pass the closure and flow through the assembly, means establishing communication between the assembly and tubing above the closure whereby the liquid flowing through said assembly is directed back into the tubing above said closure, a spring-pressed plunger for controlling the admittance of the lifting gas to the inlet passage and tube assembly, and valve means located in the inlet passage between the plunger and the tube assembly and having control means subject to the well liquid in the housing for automatically closing said passage to prevent admission of gas when no liquid is present in the housing.

21. A flow device including, a well tubing, a tubular housing adapted to be connected in the well tubing and having a gas inlet passage, means below the point of admission of the gas into the housing for closing the bore of said housing, an admission tube assembly within the inlet passage for conducting the gas into the tubing above the closure means, said assembly having means for establishing communication with the interior of the housing below said closure means, whereby the gas flowing through the assembly will act upon the well liquid to draw said liquid from the tubing and cause it to by-pass the closure and flow through the assembly, means establishing communication between the assembly and tubing above the closure whereby the liquid flowing through said assembly is directed back into the tubing above said closure, a spring-pressed plunger for controlling the admittance of the lifting gas to the inlet passage and tube assembly, means for connecting the plunger with the closure means, whereby said means is closed when the plunger is in a position permitting admittance of gas to the inlet passage, and valve means located in the inlet passage between the plunger and the tube assembly and having control means subject to the well liquid in the housing for automatically closing said passage to prevent admission of gas when no liquid is present in the housing.

ROY E. MILLICAN.